United States Patent
Ramsey et al.

(10) Patent No.: US 6,246,061 B1
(45) Date of Patent: Jun. 12, 2001

(54) COUNTERFEIT-RESISTANT MATERIALS AND A METHOD AND APPARATUS FOR AUTHENTICATING MATERIALS

(75) Inventors: J. Michael Ramsey, Knoxville; Leon N. Klatt, Oak Ridge, both of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/516,606

(22) Filed: Sep. 1, 1999

Related U.S. Application Data

(62) Division of application No. 08/141,387, filed on Oct. 22, 1993, now Pat. No. 6,035,914.

(51) Int. Cl.[7] .............................. G01J 4/00; G01J 21/19; G01J 21/21
(52) U.S. Cl. .................................. 250/458.1; 250/459.1; 235/454; 235/491; 359/352
(58) Field of Search .............................. 250/458.1, 459.1; 359/352; 235/454, 491

(56) References Cited

U.S. PATENT DOCUMENTS

| | | |
|---|---|---|
| 3,391,479 | 7/1968 | Buzzell et al. . |
| 3,880,706 | 4/1975 | Williams . |
| 4,157,784 | 6/1979 | Gröttrup . |
| 4,186,943 | 2/1980 | Lee . |
| 4,437,935 | 3/1984 | Crane, Jr. . |
| 4,455,039 | 6/1984 | Weitzen et al. . |
| 4,534,398 | 8/1985 | Crane . |
| 4,552,617 | 11/1985 | Crane . |
| 4,833,332 | 5/1989 | Robertson, Jr. et al. . |
| 4,943,093 | 7/1990 | Melling et al. . |
| 5,242,796 | 9/1993 | Prober et al. . |
| 5,974,150 | * 10/1999 | Kaish et al. ............................ 380/25 |

OTHER PUBLICATIONS

Advanced Inorganic Chemistry—Fifth Addition, F. Albert Cotton and Geoffrey Wilkinson, pp. 640 and 641 (1988).
In Re Deminski (1986) USPQ 2d §5.03 [1], pp. 5–96 through 5–100.

* cited by examiner

Primary Examiner—Constantine Hannaher
Assistant Examiner—Albert Gagliarol
(74) Attorney, Agent, or Firm—J. Herbert O'Toole; Hardaway/Mann IP Group

(57) ABSTRACT

Fluorescent dichroic fibers randomly incorporated within a media provide an improved method for authentication and counterfeiting protection. The dichroism is provided by an alignment of fluorescent molecules along the length of the fibers. The fluorescent fibers provide an authentication mechanism of varying levels of capability. The authentication signature depends on four parameters, the x,y position, the dichroism and the local environment. The availability of so many non-deterministic variables makes production of counterfeit articles (e.g., currency, credit cards, etc.) essentially impossible Counterfeit-resistant articles, an apparatus for authenticating articles, and a process for forming counterfeit-resistant media are also provided&

6 Claims, 8 Drawing Sheets

Figure 1A:
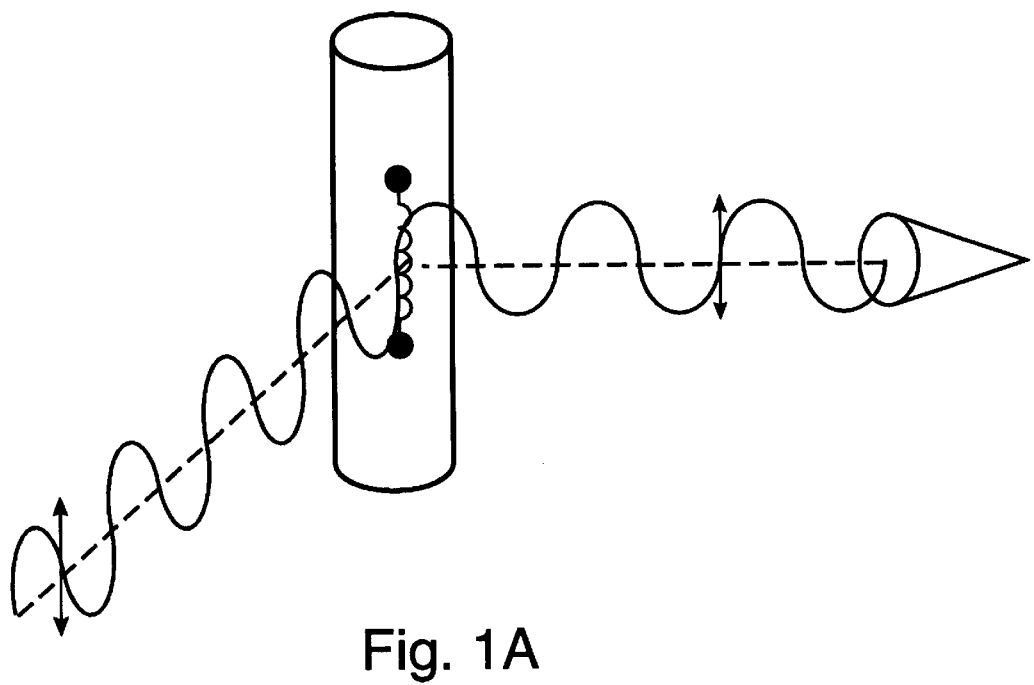

Dichroic Fluorescent Fiber Image (512 x 512 CCD Camera)
6 in. x 6 in. Paper Sheet
Excitation = 514 nm

COUNTERFEIT-RESISTANT MATERIALS AND A METHOD AND APPARATUS FOR AUTHENTICATING MATERIALS

This application is a divisional of Ser. No. 08/141,387 filed Oct. 22, 1993 now U.S. Pat. No. 6,035,914.

The United States Government has rights in this invention pursuant to Contract No. DE-AC05-84OR21400 between the U. S. Department of Energy and Martin Marietta Energy Systems, Inc.

BACKGROUND OF THE INVENTION (1) Field of the Invention

The present invention relates, in general, to the authentication of media More specifically, the present invention provides methods for authenticating papers and other media, a process for producing counterfeit-resistive items, counterfeit-resistive items, and an apparatus for authenticating documents and other media.

(2) Description of Related Art

The issues of authentication and counterfeit deterrence can be important in many contexts. Bills of currency, stock and bond certificates, credit cards, passports, bills of lading, as well as many other legal documents (e.g., deeds, wills, etc.) all must be reliably authentic to be useful. Authentication and avoidance of counterfeiting can also be important in many less obvious contexts. For example, improved verification/counterfeiting prevention mechanisms would be very useful in, for example, verifying the contents of shipping containers, quickly identifying individuals with particular health or criminal histories, etc.

A wide variety of attempts have been made to limit the likelihood of counterfeiting. For example, some have tried to assure the authenticity of items by putting coded or uncoded markings thereon (e.g., an artist's signature on his or her painting). Unfortunately, as soon as the code is broken— e.g., a counterfeiter learns to duplicate a signature, this method becomes worthless for authentication purposes. In the context of paper products (e.g., currency), counterfeiting-prevention methods have also used two-dimensional authentication mechanisms—e.g., watermarks or special threads incorporated within the paper used to make the currency. These mechanisms are clearly helpful, but they can also be overcome. For example, counterfeiters routinely bleach a one dollar bill (in such a way that the colored threads which mark the special currency paper are not damaged) and then imprint the markings of a one-hundred dollar bill thereon.

Other authentication methods have utilized mechanisms which provide three dimensions of data. For example, the holograms provided on many credit cards provide more variables (i.e., relative to two-dimensional threads or watermarks) which may be precalibrated, and thereafter, used to verify the authenticity of an item. Nevertheless, since holograms have a pre-set, or deterministic, pattern they may also be duplicated, and counterfeit products made. Authentication mechanisms which utilize deterministic patterns are inherently vulnerable to counterfeiting since the counterfeiter, in essence, has a "fixed" target to shoot at. This is the reason that military codes are frequently changed. At the other end of the spectrum, a random authentication mechanism would provide an incessantly "moving" and nonrepeating target which would be practically impossible to duplicate.

Finally, although existing authentication mechanisms provide adequate protection against counterfeiting in some context, increasingly valuable documents require increasingly reliable levels of authentication. Furthermore, current counterfeiters have access to extremely powerful tools— e.g., color photocopying equipment, reverse engineering of semiconductor chips, etc. These factors have combined to provoke strong demand for new methods and mechanisms for authenticating items, especially methods and mechanisms which are less vulnerable to counterfeiting.

SUMMARY OF THE INVENTION

The present invention soles the above-noted problems and overcomes the suboptimizations inherent in the prior art by providing an authentication mechanism utilizing fluorescent dichroic indicators. Fibers or other tubular elements function very well as the indicators. Fluorescent dichroic fibers can provide an extremely reliable means of authentication for a wide variety of products. For example, fluorescent, dichroic fibers may be incorporated into paper used to print currency or laminated into plastic products such as credit cards. Alternatively, fibers may be incorporated into an aerosol dispenser—e.g., for use in verifiably marking container&

Fluorescent dichroic fibers provide authentication mechanisms that are exceptionally difficult to counterfeit. Importantly, the fibers are distributed throughout the media in a random fashion during the production process. Thus the fiber related signature is a random variable rather than a deterministic one. The signature of every item will be different making it more difficult to reverse engineer. For example, two dimensional images (e.g. in the x-y plane) of papers incorporating the inventive fluorescent dichroic fibers provide increased security over the prior art "blue" threads used in currency. A comparison of a white light image and a fluorescence image showing the two dimensional distribution of florescent dichroic fibers provides unique information. Fibers lying at or near the surface of the paper are easily observed by the white light image but are quickly masked below the surface. In a fluorescence image, fibers that lie below the surface are also readily observable. A comparison of the two images provides a signature. Furthermore, processing of the paper (calendaring) further alters this image comparison. The pressing process reduces the fluorescence from the surface fibers while not perturbing the subsurface fibers thus depth information is available by comparing the two images. Hence, even when not utilized in the most preferred mode, the inventive method provides improved authentication relative to previously available methods.

Furthermore, since fluorescent dichroic fibers are used in the invention, the fibers' emission characteristics will also vary depending upon the angular orientation of the fibers within the media relative to a polarized excitation source For example, at a given wavelength, the intensity of electromagnetic energy emitted by the fibers may vary by up to a factor of five depending upon whether the fibers within the media are vertically or horizontally oriented relative to the direction of a linearly polarized excitation source and a parallel polarization analyzer. Hence, the dichroic nature of the fibers provides a fourth variable for each point along the fiber (i.e., x, y, z and dichroism/emission behavior). This makes it exceedingly more difficult to duplicate/counterfeit the media containing the fibers of the invention.

Furthermore, since dichroic fibers are used in the invention, each fluorescent dichroic fiber, through its emission spectrum, can provide data on the fiber's local environment For example, consider the use of the present invention in paper media or in an aerosol application. The local environment of the fluorescent, dichroic fibers cause photon scattering (e.g., the orientation and number density of the paper fibers) and absorption (e.g., varying thickness of the dried carrier vehicle in an aerosol application). This local environment is indirectly observed through the measurement of the fluorescent dichroic fiber's apparent fluorescent anisotropy. The apparent fluorescent anisotropy provides the fourth data dimension. This fourth data dimension has random values because the process of incorporating the inventive fibers into the media is a random process. This preferred mode of utilization of the inventive method provides the greatest improvement to the authentication and makes it extremely difficult to duplicate/counterfeit the media containing the fibers of the invention.

In addition to increased security relative to prior art methods, the invention provides an authentication mechanism of varying levels of imperviousness to counterfeiting. Depending upon the security/authentication requirements of the particular application, and hence the permissible level of expense, the user may employ the inventive method in any of several modes of operation. For example, at the first level (i.e., the lowest authentication/lowest cost), an item having fluorescent dichroic fibers incorporated therewith may merely be checked to see that the fluorescent fibers are present in the item. Even this level of authentication can be very valuable-especially since the particular fluorescent agent used for the particular item may be kept secret and dyes which fluoresce in non-visible regions of the electromagnetic spectrum may be employed.

At the second level of authentication accuracy, an item having fluorescent, dichroic fibers may be checked to see that the florescent fibers present in the media have the correct fluorescence anisotropy. This level of authentication exceeds that of the first level because the fluorescence anisotropy is dependent upon the molecular structure of the fluorescent molecule and the specific processing conditions used to prepare the fibers containing the fluorescent molecules Again, both the particular fluorescent molecule and the processing conditions can be kept secret.

The third level of authentication accuracy would involve generating a prerecorded x-y pattern of the fluorescent fibers in the item (e.g., by logging the particular random pattern of fibers present in a particular credit card when the card is manufactured). When the item is presented for authentication the observed pattern is compared with the prerecorded pattern. Since each item would have a unique pattern, detection of a counterfeit would simply involve detection of a duplicate or unmatchable pattern. The requirement of a unique match between the observed and prerecorded pattern provides a higher level of imperviousness to counterfeiting than the above two implementations of the inventive method.

At the highest level of authentication accuracy, the x-y-apparent fluorescent anisotropy pattern of the fluorescent dichroic fibers in the item would be prerecorded. As in the above case, when the item is presented for authentication the observed pattern is compared with the prerecorded pattern. Since the values for the variables in the x-y-apparent fluorescent anisotropy pattern are random, this level of authentication yields an item that is virtually impossible to duplicate. Calculations, using the number of density of "blue" and "red" fibers incorporated into currency paper as a base case, indicate that the probability of a random repeat of the x-y-apparent fluorescent anisotropy pattern is about 1 part in $10^{1000}$, an extremely unlikely event.

BRIEF DESCRIPTION OF THE DRAWINGS

The present invention may be further understood by way of reference to the drawings, wherein:

FIG. 1 is a perspective view explaining dichroism—i.e., that the intensity of the output light/electro-magnetic emission varies according to the angular relationship between the input light and the media receiving the light;

FIG. 2 is a graph showing the angular dependence of fluorescence emission for a fluorescent dichroic fiber. The angle indicated is that between the fiber axis and coaligned excitation and detection polarizations;

FIG. 3 is an image of the emission behavior of fluorescent dichroic fibers in a sheet of paper;

FIG. 4 is a graphical representation of emission spectra for a fluorescent dichroic fiber within a sheet of paper. The two spectra are for light emitted parallel (vertical) and perpendicular (horizontal) to the fiber axis. A circular polarized excitation source is used that provides equal excitation intensities parallel and perpendicular to the fiber axis;

FIG. 5 is a graphical representation of emission spectra for a fluorescent dichroic fiber within a sheet of paper, wherein the fiber is largely obscured by paper fibers;

FIG. 6 is a graphical representation of the emission spectra of a fluorescent dichroic fiber within a sheet of paper, wherein the fiber has been deformed by calendaring (the two spectra are as per FIGS. 4 and 5);

FIG. 7 is a functional diagram of the inventive apparatus for authenticating materials; and, FIG. 8 is a stylized perspective view of a process for manufacturing fluorescent fibers suitable for use in the inventive process showing the aligning of fluorescent molecules to produce dichroic behavior.

DETAILED DESCRIPTION OF THE PREFERRED EMBODIMENTS MATERIALS

In order to provide improved authentication and avoidance of counterfeiting the present invention utilizes fluorescent dichroic indicators. As represented in FIG. 1, materials which are dichroic have different absorption coefficients for light (i.e., electro-magnetic energy) polarized in different directions. In FIG. 1, the vertically polarized light is parallel with the absorbing dipole of the molecule. When the energy of the incident photon corresponds to the absorption transition of the molecule, the interaction between the absorbing dipole and the incident photon is largest and high absorption of incident photons is observed. This energy is emitted by a fluorescent molecule with the plane of polarization of the emitted photons aligned with the emitting dipole of the molecule. Most molecules have the absorbing and emitting dipole approximately collinear. When the polarization of the exciting light is collinear with the absorption dipole, the fluorescent emission will be highest Horizontally polarized light (lower figure in FIG. 1), on the other hand, is not absorbed to a great extent because the plane of polarization is not aligned with the absorbing dipole; hence, the emitted intensity is low. Although FIG. 1 shows dichroism depending upon the orientation of the input light, dichroism may obviously also be seen where the light-source is stationary but the fibers have differing orientations.

To be useful as an authentication indicator it is important that the material be dichroic. As noted above, more preferably, the dichroic material will exhibit a high degree of dichroism. It is not important, however, in what form the dichroic materials are introduced into the media being authenticated. For example, there may be situations where authentication is facilitated by using dichroic indicators in the form of ribbons, rectangles, pyramids, spheres, etc. As long as the indicator's dichroism is reasonably preserved during formation of the article (i.e., incorporation of the dichroic indicators with the article), the shape/form of the dichroic indicator is not important. A preferred form for the dichroic indicator is a fiber. Fibers may advantageously be used to incorporate the desired dichroic behavior into the article since fibers may be incorporated within many processes without detriment to the process (e.g., paper making) or dichroic fiber. The fibers may be of widely varying cross-sections and lengths. Essentially the only requirement is that the configuration of the fiber not disrupt the underlying manufacturing process (e.g., with aerosol applications the fibers must be sufficiently small to be sprayed). Where otherwise feasible, the dichroic fibers are somewhat elongated since elongated fibers are easier to identify within a matrix of material and can potentially provide more data than shorter fibers (e.g., since different points along the length of a long fiber may be more or less obscured by paper fibers, be closer to or further from the paper surface etch, and hence, exhibit more or less dichroism). Finally, in some circumstances it may be possible to use fibers of uniform lengths to provide easily verifiable data points—i.e., when inquiring whether a marked article is authentic, one can quickly see if fibers of appropriate lengths are present. Synthetic polymer materials are preferred for the fiber material, e.g., Nylon 6,6. A wide variety of acceptable indicator materials are available at very low cost.

Figure 2:
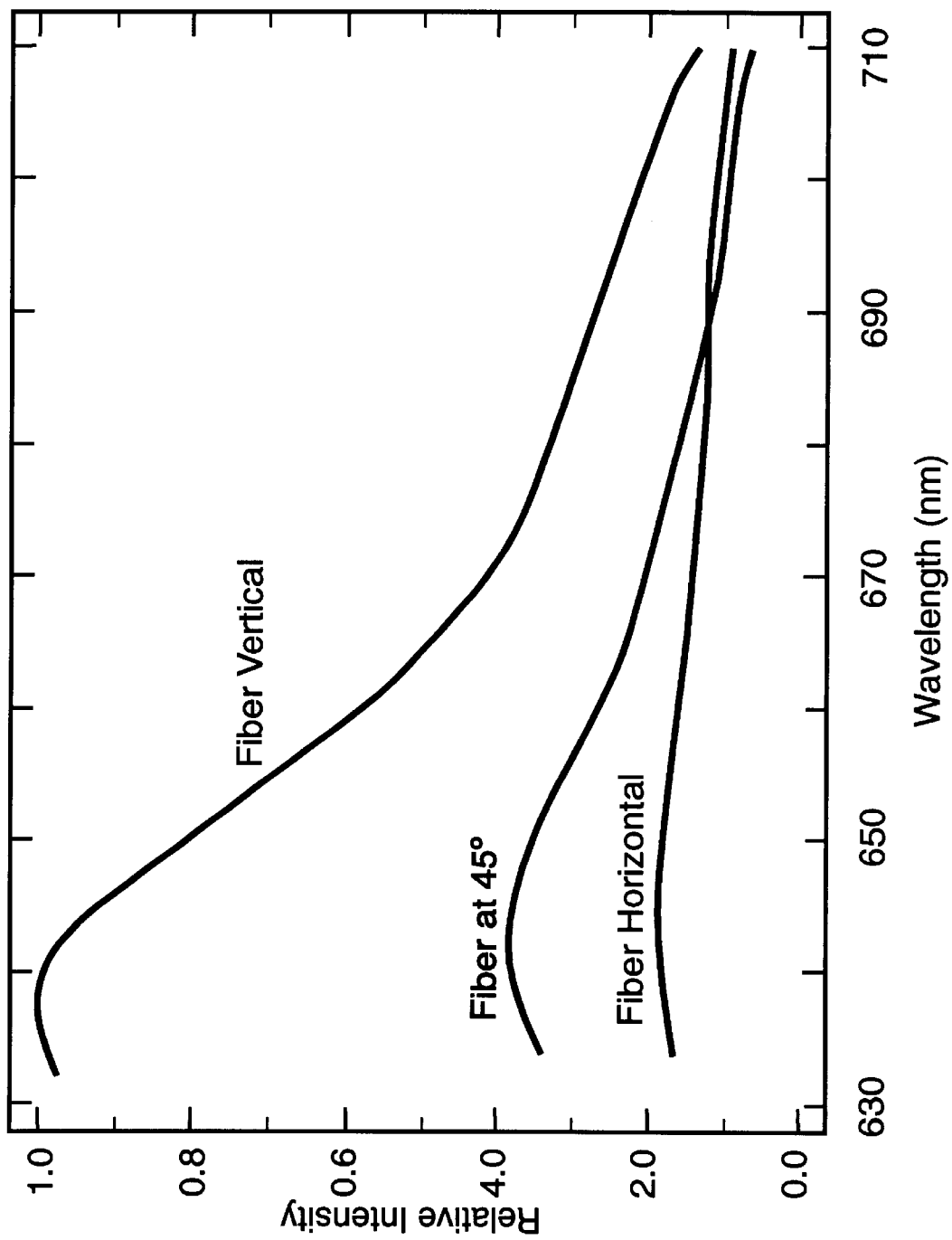

The dichroic agent can be brought into association with the indicator in a variety of ways. The important criterium is that the dichroism be maximized by having the dichroic agents (e.g., molecules of dye) in maximal alignment. It does not matter in which direction the dichroic molecules are aligned as long as the maximal number of molecules are similarly aligned (otherwise the emission spectra convey less information as the differences between the readings from one angular direction and another decrease—i.e., the three spectra in FIG. 2 move together. This is important since, as discussed above, the less information the indicator fibers convey, the easier it is to duplicate/counterfeit the fiber-containing item.

Figure 1B:
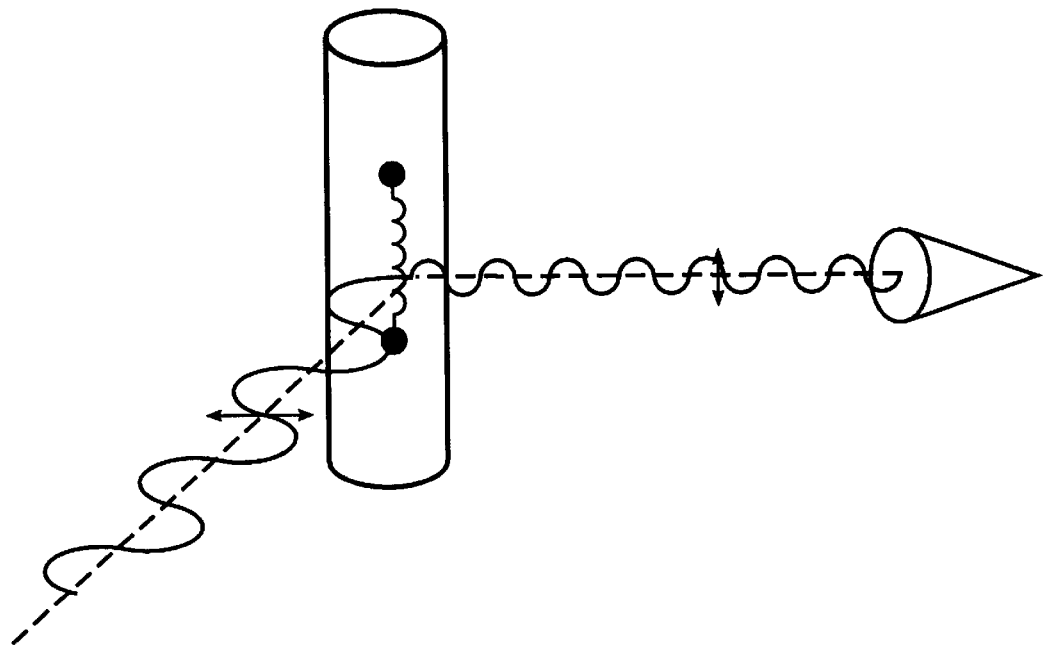
Figure 8:
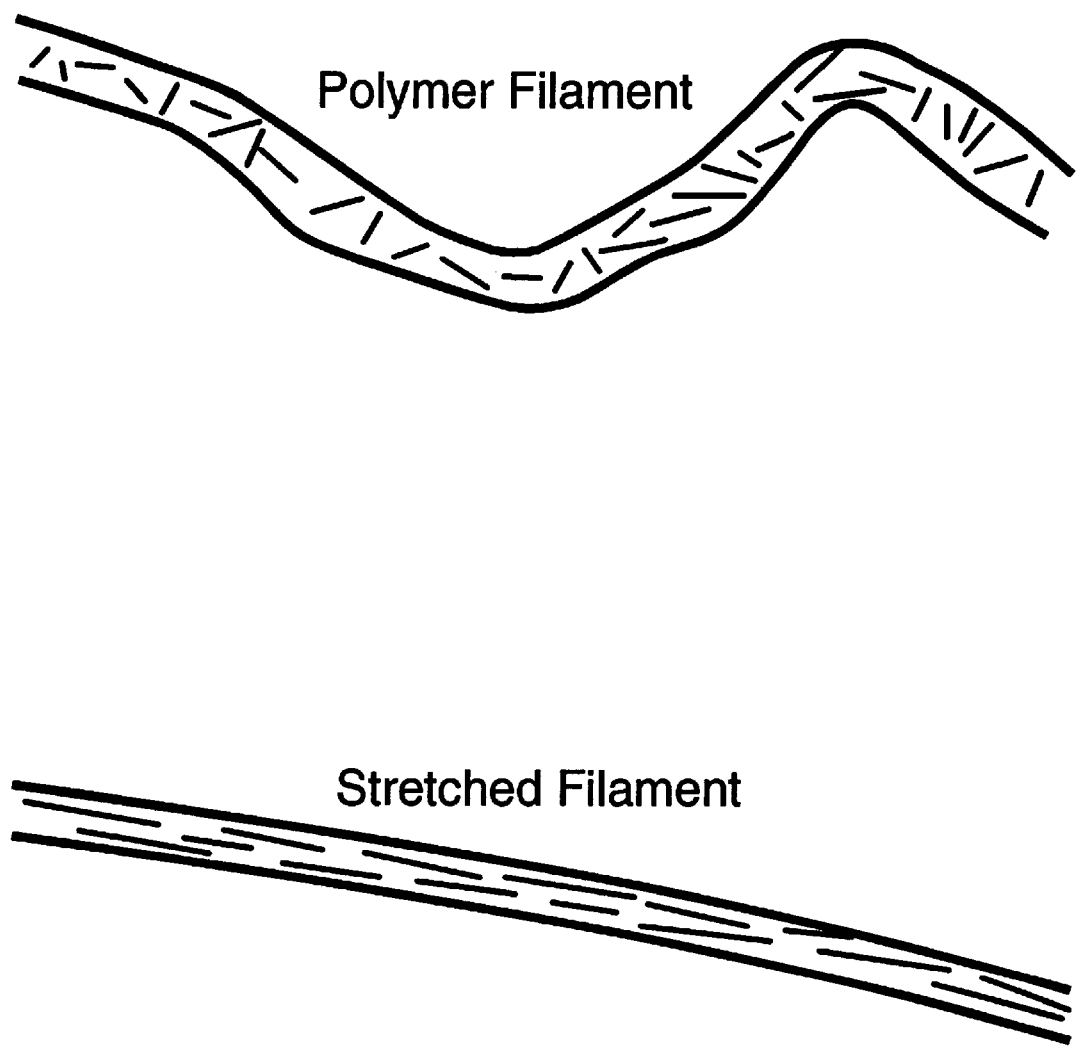

Preferably, when fibers are used as the indicator, the dichroic marking material is aligned along the length of the fiber (see FIG. 8). In this way the fibers will have very different emission spectra (i.e., with respect to intensity) when excited with light polarized parallel versus perpendicular to the fiber axis, assuming the absorption dipole is along the fiber axis (see FIG. 1). In general the absorption dipole of the fluorescent marking molecule will not be perfectly aligned with the fiber axis. This is permissible, but it is preferred that the absorption dipole is nearly parallel or orthogonal to the fiber axis (see FIG. 1).

The marking material (e.g., a fluorescent dye) may be associated with the indicator material (e.g., fibers) during formation (i.e., the marking material may be incorporated within the indicator itself), or the marking material, may be added to the indicator after formation of the indicator. For example, when fibers are used as the indicators and luminescent dye is used as the marking material a preferred method of assuring maximal dichroism (i.e., maximum coalignment of dye molecules) is to melt blend the fibers and dye and then stretch the fiber (see FIG. 8). With other fiber/marking dye combinations it may be possible to achieve satisfactory dichroism without a stretching step— e.g., by dipping the fiber in a container of dye.

The preferred dyes in the present invention are luminescent (i.e., fluorescent or phosphorescent). More preferably, fluorescent dyes are utilized as the marking material Phosphorescent marking materials may also be used, however.

The appropriate dye for use in a particular application will depend upon the specifics of the situation. In general, most preferably a fluorescent dye is selected so that the dye's dichroism is maximized at the intended detector wavelength For example, the dye used in the test results shown in FIG. 2 would more preferably be used in situations where detection will occur at 640 nm rather than at 690 nm. The marking dye may be tailored to quite specific applications. For example, a dye which emits in the infrared portion of the spectrum may be used to create an authentication signature which is invisible to the eye yet easily detected with appropriate instrumentation.

A fluorescent dye or pigment doped into the polymer preferably provides the fluorescence signal The fluorescent dye or pigment should be a molecule with a long major axis to align with the fiber during the drawing process The pigment Renol Violet RL-AN (a trademark of the American Hoechst Co. of e.g., Somerville, N.J.) is an example of a possible pigment. Other dyes that are expected to be suitable are DTDC Iodide, Styrl 7, DOTC Iodide, etc. (as well as other chemicals listed in the Kodak laser dyes catalog). A fluorescent dye or pigment must also be sufficiently stable, thermally, to withstand the fiber production process. A wide variety of acceptable dyes are available at very low cost Furthermore, the cost of associating the fibers with the marking molecules is also minimal.

The required/preferred concentrations of dye track those utilized in fiber technology generally—i.e., no special processing is required to combine the indicator and marking materials—except for perhaps an added process step to coalign the dye molecules within/along the indicator fibers as discussed above (see FIG. 8).

Method

The indicator and marking materials of the present invention provide an extremely reliable method for authenticating media (e.g., paper, plastic, etc.). After an appropriate indicator and marker material have been selected for a particular application, the materials are combined (e.g., a fluorescent dichroic fiber is assembled). Thereafter, the authenticating/ indicator material may be incorporated into most manufacturing processes without damaging the process, the finished product, or the authenticating material For example, fluorescent dichroic fibers may be incorporated into paper-making processes (see FIG. 3). The marking materials may be incorporated into a vast variety of other manufacturing process—e.g.: laminated or otherwise incorporated into plastic products; incorporated into aerosol marking sprays, etc.

Figure 3:
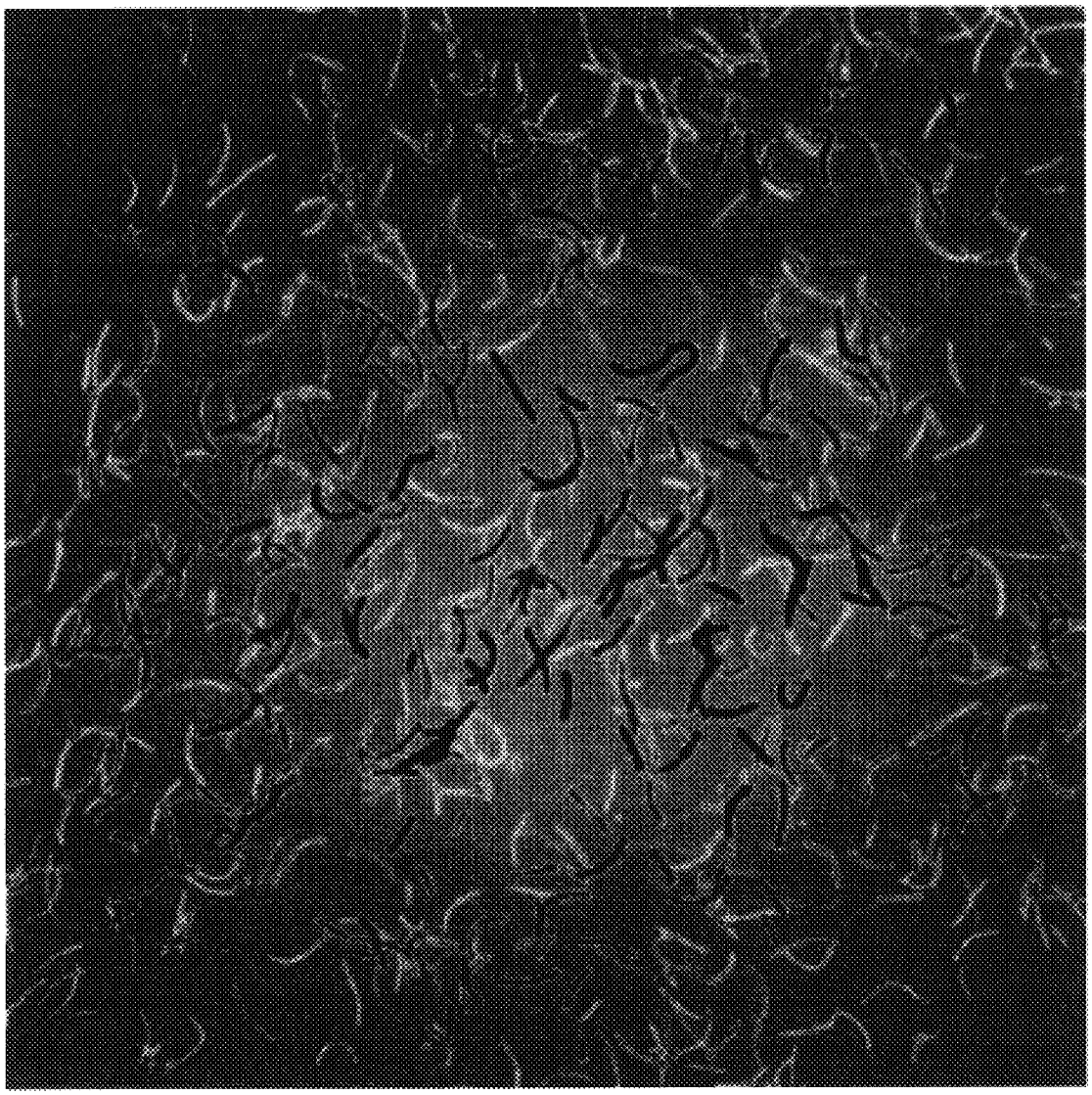

As discussed above, the inventive fluorescent dichroic fibers can be used to provide several levels of increasing authenticatiom/counterfeiting-detection. For example, if the paper containing fluorescent dichroic fibers of FIG. 3 is used to print money, a first level of authentication is provided by checking that a bill of currency presented for payment contains fluorescent fiber The next level of authentication may comprise ascertaining whether the fluorescent fibers are dichroic. Just these first two levels of authentication provide significant counterfeiting protection. For example, to duplicate currency containing the inventive fluorescent dichroic fibers, a counterfeiter would need to, among other things: duplicate the fluorescent dye used (to produce the same emission behavior at the selected detector wavelength); use fibers of the same general length and shape; and produce counterfeit currency having the same general number of fibers per a given area of paper. For example, any attempt to counterfeit the fiber-containing currency through a printing-based process would fail since printing would not reproduce the fibers' dichroism.

At a higher level of authentication, the pattern of the fluorescent dichroic fibers is detected and archived during formation thereof (i.e., before the paper is circulated). When a particular paper (e.g., bond certificate, will, etc.) is submitted, a detector can be used to ascertain the fibers' position within the paper. Hence, a two-dimensional (i.e., x, y) authentication mechanism can easily be provided. Unlike previously available two dimensional methods, however, the fiber pattern of the inventive method is random-not deterministic, and hence, is much harder to reverse engineer/counterfeit.

At a highest level of security and authentication, the marked item (e.g., currency, bearer bond, etc.) is measured before it is circulated to record the x, y, θ physical disposition of the fibers within the media (e.g., paper), where the Theta, θ, parameter relates to the spatial variation of the dichroism Later, when an item is submitted for authentication, each point along each fiber has three known datapoints (e.g., x, y, and θ). The difficulty involved in making a duplicate would be essentially infinite. For example, it is calculated that, given a fiber density of 12 fibers per square inch, the chance of randomly encountering a duplicate would be about one in $10^{1000}$ printed notes. Despite this extreme level of uniqueness, accurate detection readings may be accomplished in very short time periods (e.g., 25 milliseconds for a bill of currency sized paper). Also, as will be discussed hereinafter, the inventive detector can accomplish measurements of fluorescent fiber dichroism at a rate of 400 inches/sec.

Apparatus

Figure 7:
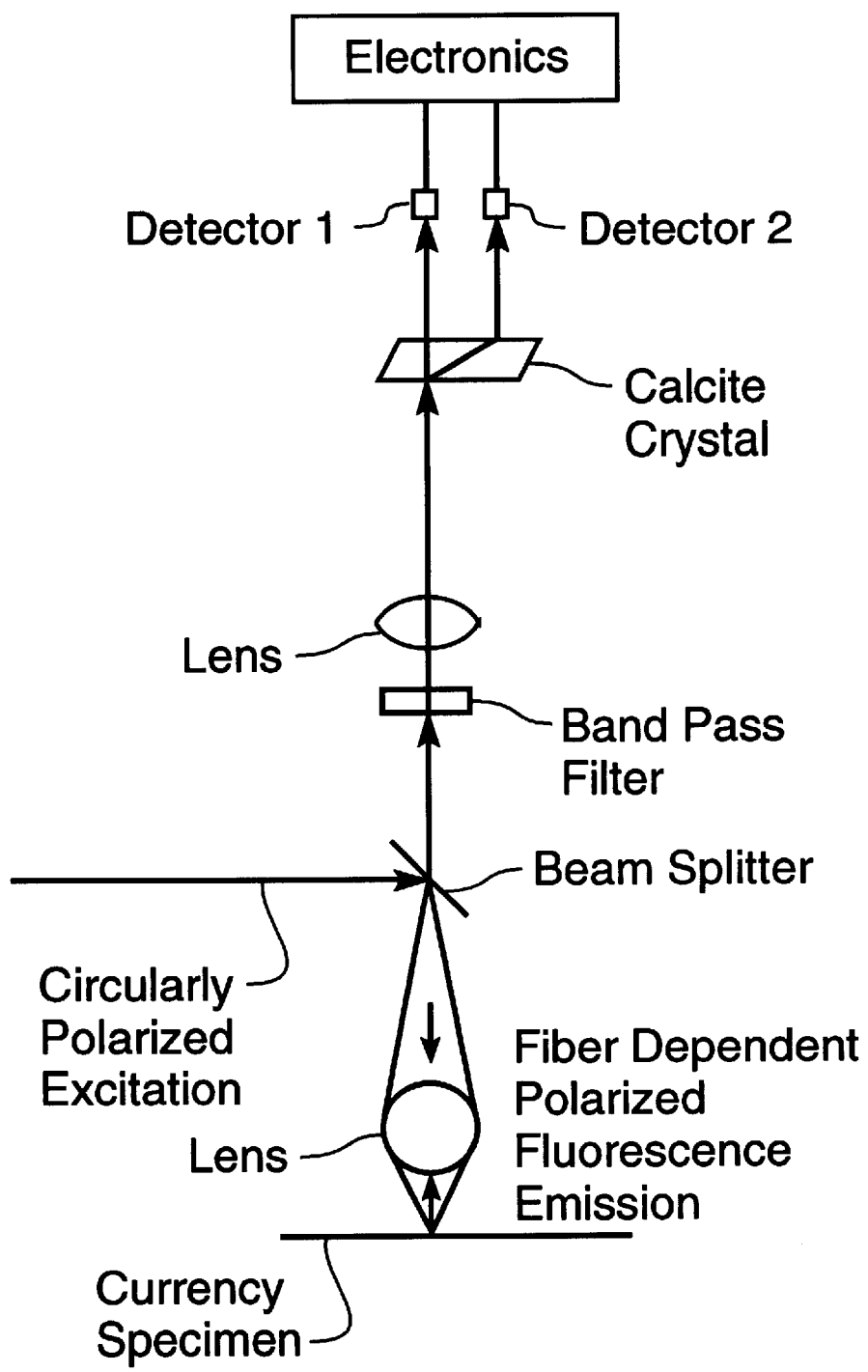

FIG. 7 shows a schematic representation of a potential design for a detector suitable for use in the present invention. This unit could read the patterns of the indicator fibers during production (i.e., for archiving purposes), and/or provide the detection of the fibers in the media during the authentication of a specimen.

As shown in FIG. 7, one detection system would function as follows. Circularly polarized radiation from a laser beam is expanded and focused to form a line image on the currency specimen. The currency specimen moves at a constant and predefined velocity. Fluorescent radiation emitted by the fibers is collected by a cylindrical lens, isolated with a band pass filter, and separated into the parallel and perpendicular polarized components by a calcite beam displacer. The two beams emerging from the calcite crystal are then detected by two linear photodiode arrays (i.e., to measure the fiber's dichroism).

Alternatively, a document could be read in a manner similar to a flash photograph. In this case radiation from a pulsed light source is polarized alternately in two orthogonal directions. On each flash an image of the entire document is recorded by a two-dimensional solid-state detector such as a CCD device. Clearly, within these broad functional parameters a wide variety of specific apparatuses may be configured.

Preferably, the authentication apparatus includes signal processing electronics which calculate an output for each pixel of an item (e.g., bill of currency) defined by:

$$Signal=(D2-D1)/(D2+D1)$$

where D2 is the intensity of the parallel polarized light and D1 is the intensity of the perpendicular polarized light. The absolute value of the signal must be greater than a threshold value, which is defined by the anisotropy of the fiber and its local environment in the paper. The sum of D2 and D1 will also be compared against a threshold value to insure that the information is due to fluorescence (or luminescence) and not due to background signal or detector noise. By defining the signal as a ratio, errors due to source intensity fluctuations are eliminated.

In designing a detection system based upon the inventive fluorescent dichroic fibers, the fluorescence intensity from the paper (media) relative to the fiber establishes the pixel size in the image; the background signal increases with the area of the pixel while the fiber emission signal increases with the linear dimension of the pixel. It is estimated that a pixel dimension of 0.3×0.3 mm is required to provide an acceptable signal-to-noise ratio (for the fibers tested). The pixel size, the number of pixels per line, and the specimen velocity during the detection/authentication operation determine the frequency of pixel readout. Assuming a specimen velocity of 400 inch/sec 0.3×0.3 mm pixel, and 64 pixels per line yields a pixel frequency of 2.17 MHz. This frequency is achievable with several currently-available solid state linear photodiode arrays.

The required photon power, $P_p$, from the laser head is given by the following equation:

$$P_o = S_d N_d / A_e Q_e d_f f_a I_e O_e$$

where $S_d$ is the photon power per diode, $N_d$ is the number of detector diodes, $A_e$ is the probability of photon absorption by the fluorophor, $Q_e$ is the quantum efficiency of the fluorophor, $d_f$ is the fraction of light collected by the detector optics, $f_a$ is the fraction of the pixel area occupied by the fiber, $I_e$ is the transmission efficiency of the input optical system, and $O_e$ is the transmission efficiency of the detector optical system.

Assuming that the background signal should be at least 10× the root-mean-square noise of the detector and preamplifier and 0.05 as the probability for $A_e$ and $Q_e$, we obtain a value of about 1 watt for $P_o$. This power is readily available from commercially available lasers, such as argon-ion, krypton, and diode laser

EXAMPLE I

The present invention can be better understood by reference to the following non-limiting example.

The paper specimens employed in this study were hand sheets prepared by the US Arm Natick Research and Engineering Center, Natick, Mass. (hereinafter referred to as NArICK) (i.e., paper as per that currently used for currency). The indicator fiber material was nylon 6,6 and the fluorescent additive used was the pigment Renol Violet RL-AN (a trademark of the American Hoechst Co. of e.g., Somerville, N.J.). The fibers had a color similar to the blue fibers currently added to currency paper. The fiber density within the paper was approximately 12 fibers/inch². The specimen examined in detail was pressed at 100,000 lbs/inch² pressure to simulate the calendaring processes commonly employed during paper formation The specimens were stored at room temperature upon arrival at the Oak Ridge National Laboratory, measurements were performed at room temperature.

All measurements were made with a research Raman spectrometer. Table I lists the significant specifications of this instrument.

TABLE I

Significant Specifications of Raman Spectrometer

| Double Monochromator: | Detector: |
|---|---|
| stray light rejection: $10^{-14}$ at 20 cm$^{-1}$ from the Raleigh line; wavelength resolution: 0.5 cm$^{-1}$ at 514 nm; wavelength accuracy: 1 cm$^{-1}$; and wavelength repeatability: 0.1 cm$^{-1}$. | GaAs photomultiplier tube; photon counting mode; and noise 1–5 counts/second |

The data were collected using the machinery in what is known as the retro reflection mode. In this mode, the emitted radiation is observed from a direction that is collinear with, but propagating opposite to the direction of the exciting radiation. The paper specimen is always perpendicular to the laser optical axis.

The 462 cm$^{-1}$ Raman band (symmetric vibrational mode) of liquid CCl$_4$ was used to verify that the system had equal sensitivities for detection of vertically and horizontally polarized radiation. The spectra were not corrected for the wavelength dependence of the monochromator transmission and photomultiplier sensitivity. Based upon spectral data, the 514.5 nm line from an argon-ion laser was selected to excite the fluorescence. Beam power after the neutral density filter was about 1.5 mW. Beam diameter at the specimen was about three times the fiber diameter (fiber diameter of about 25 μm).

All spectra were normalize with respect to the maximum signal observed for the vertical component of the emitted radiation. Unless noted otherwise, all spectra reported herein have been corrected for a small background fluorescence signal from the paper.

Results

Fibers in three different environments were studied: (1) fibers clearly below the surface of the paper but with regions on one side of the paper that were not covered with paper fibers; (2) indicator fibers within the paper and obstructed by paper fibers; and (3) fibers on the surface that appear to have been deformed by the paper pressing operation. It is important to note that not many fibers fall into this last classification. Comparison measurements on a fiber from the same manufacturing lot but mounted in free space were also completed.

Figure 4:
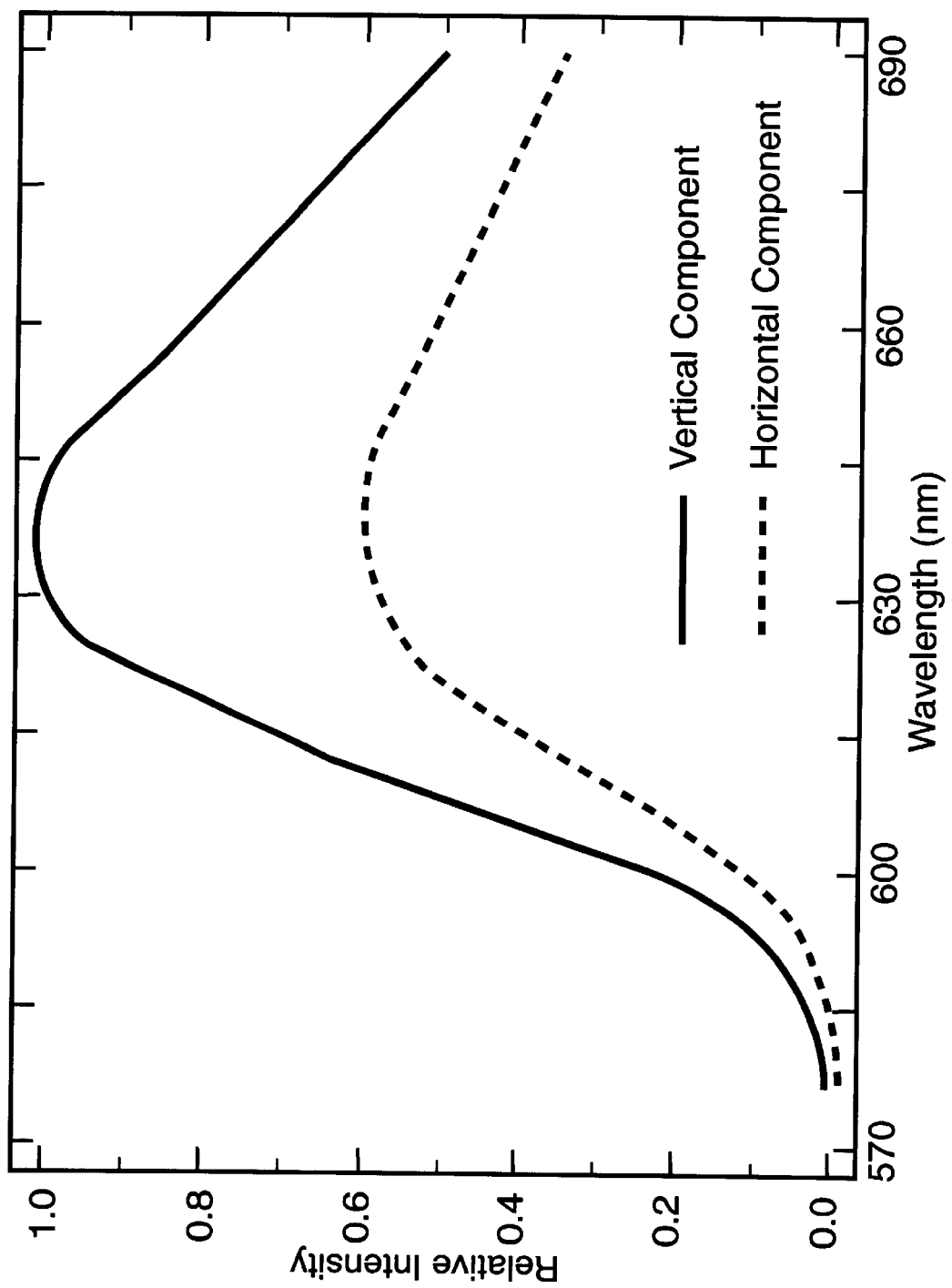

FIG. 4 shows the fluorescence emission spectra from a section of paper containing a fiber clearly beneath the paper surface but which has significant segments on the side being viewed that were unobstructed by paper fiber& The large difference between the magnitude of the vertically and horizontally polarized components of the fluorescence emission proves that the fluorophor has retained its preferential alignment (i.e., dichroism) along the fiber axis through the paper preparation process.

Comparing the spectra shown in FIG. 4 with similar measurements on a fiber mounted in free space reveals that the ratio of the magnitudes of the two polarized components is smaller by about a factor of two for the fiber in the paper. Two factors are responsible for this decrease First, the anisotropy of the free fiber measured at 514.5 nm is 0.42 compared with 0.59 measured at 632.8 nm. This decrease in anisotropy with wavelength is commonly observed It results from excitation to an electronic state higher than the emitting state followed by thermal decay to the lower electronic state from which fluorescence emission occur& In these situations, the absorbing and emitting dipoles of the marking molecules are not necessarily collinear, resulting in a lower anisotropy. We estimate that about two-thirds of this change in intensity ratio (i.e., fluorescent dichroic fiber in paper versus in free space) is due to the change in anisotropy. Second, when the fiber is contained in the paper, some fraction of the radiation emitted in a direction away from the collection optics can be scattered into the detection system with a corresponding loss of polarization. Some of the exciting radiation is also scattered. For the free fiber both scattering mechanism are absent.

Measurements on other fibers in similar environments yielded ratios for the intensity of the horizontal to vertical components ranging from 0.59 to 0.8. Based upon the reproducibility of the measurement, a change in the intensity ratio of 6% is considered significant These changes in intensity ratios for fibers nominally in similar environments are probably due to different amounts of light scattering caused by the paper fibers.

Figure 5:
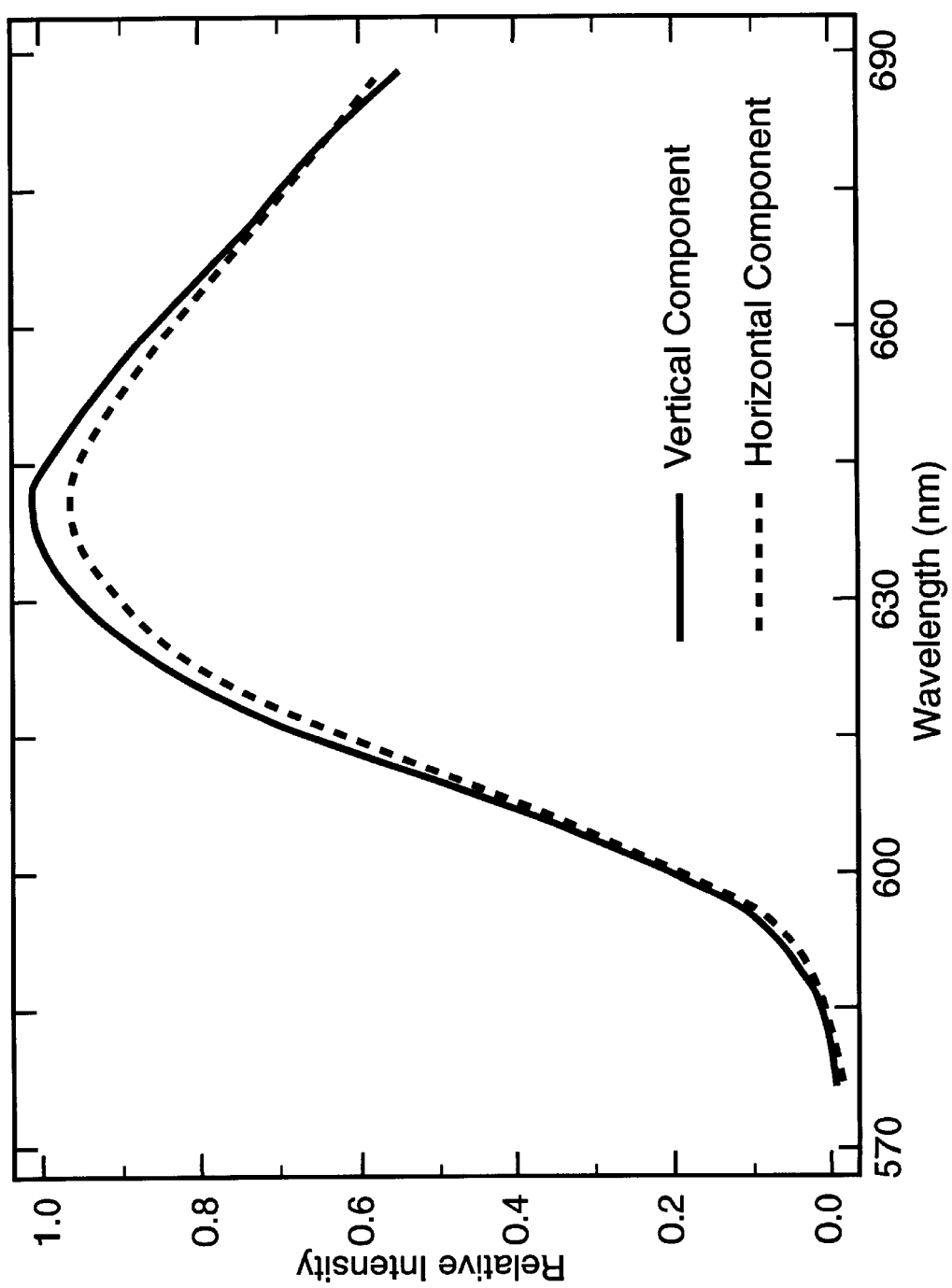

FIG. 5 contains the observed fluorescence spectra from a fiber which is largely obscured by paper fibers. The paper fibers scatter the fluorescence radiation emitted by the indicator fibers. This causes the observed emission to be depolarized, and hence, less dichroic.

Figure 6:
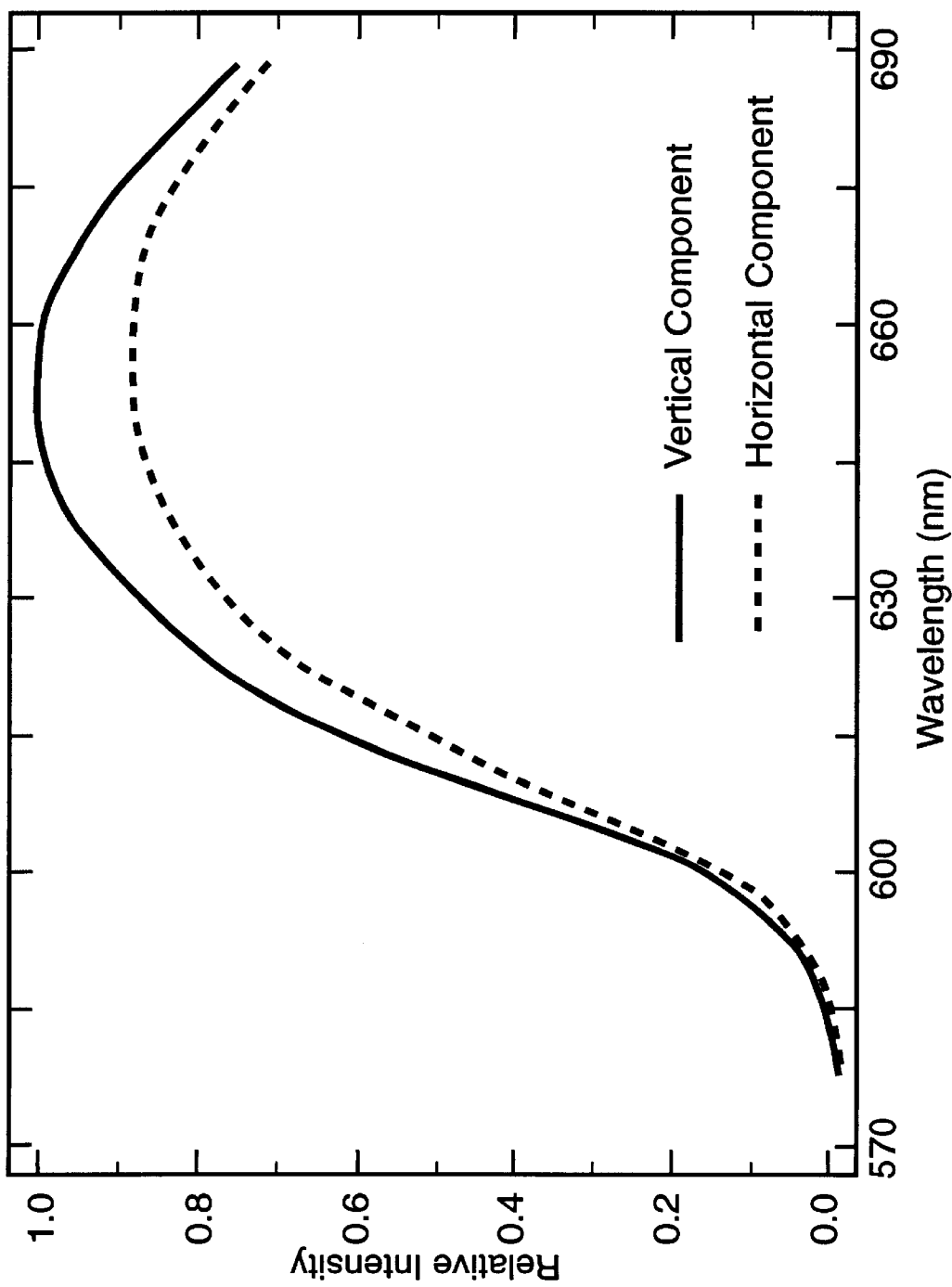

The fluorescence spectra obtained from an indicator fiber on the surface of the paper that has been deformed by the calendaring process are shown in FIG. 6. A small amount of anisotropy is observed; however, it is significantly less than that shown in FIG. 4. The deformation (flattening) redistributes the molecules in the fiber and reduces fluorophor alignment along the fiber axis.

Thus, the fiber fluorescence anisotropy exhibits a local environment dependence as discussed above. This dichroic effect essentially adds a fourth dimension to the detectable spacial parameters of the indicator fibers, which increases the information content of the detection measurement, thereby increasing the difficulty of counterfeiting the document. These parameters are the two spatial coordinates (x, y), the anisotropy/angularity of the indicator and the dichroism perturbations provided by the local environment within the media (the latter two parameters are contained in the measured anisotropy/angularity).

While there have been shown and described what are at present considered to be the preferred embodiments of the invention, it will be clear to those skilled in the art that various changes and modifications may be made thereto without departing from the scope of the inventions defined by the appended claims.

What is claimed is:

1. A method for authenticating media, comprising:
    a) providing a stored representation of an image corresponding to a media having a plurality of randomly disposed optically detectable indicators therein;
    b) comparing the stored representation with a subsequently acquired representation of an image corresponding to a media having a plurality of randomly disposed optically detectable indicators therein; and
    c) authenticating the media based on the comparison of the respective pluralities of randomly disposed indicators, said comparison being sensitive to an optical polarization of the optically detectable indicators.

2. The method according to claim 1, wherein the indicators have a fluorescent characteristic such that when illuminated with light of a first wavelength, a polarized light of a second wavelength is emitted, said first and second wavelengths being different; and wherein said imaging step comprises ascertaining the fluorescent characteristic.

3. The method according claim 2, wherein a fluorescent emission of the indicators is polarized; and wherein said imaging preserves information relating to a polarization of fluorescent emissions.

4. The method according to claim 1, wherein the indicators each comprise a polymer having a crystalline characteristic and fluorescent dye molecules, the fluorescent dye molecules being organized within the polymer resulting in a detectable dichroic optical property.

5. The method according to claim 1, wherein the indicators comprise fibers formed of fluorescent dye molecules and an organized linear chain polymer structure, the fluorescent dye molecules being aligned within the polymer resulting in a dichroic optical property.

6. The method according to claim 1, further comprising the steps of a) illuminating the medium with light having a wavelength corresponding to a specific fluorescent absorption of the indicators;

b) selectively measuring a dichroic axis of light corresponding to the fibers having a wavelength corresponding to a specific fluorescent emission of the indicators;

c) said comparing comprising correlating a dichroic axis of emission of the stored representation with the subsequently acquired representation.

* * * * *